(12) United States Patent
Bond et al.

(10) Patent No.: US 6,804,421 B2
(45) Date of Patent: Oct. 12, 2004

(54) MONOLITHIC EXPANDED BEAM MODE ELECTROABSORPTION MODULATOR

(75) Inventors: Aaron Bond, Orefield, PA (US); Ram Jambunathan, Allentown, PA (US); Won Jin Choi, Allentown, PA (US)

(73) Assignee: T-Networks, Inc., Allentown, PA (US)

( * ) Notice: Subject to any disclaimer, the term of this patent is extended or adjusted under 35 U.S.C. 154(b) by 357 days.

(21) Appl. No.: 10/056,929

(22) Filed: Jan. 25, 2002

(65) Prior Publication Data

US 2003/0142895 A1 Jul. 31, 2003

(51) Int. Cl.[7] .......................... G02F 1/035; G02B 6/26; H01S 3/00
(52) U.S. Cl. .............................. 385/2; 385/20; 359/344
(58) Field of Search .................................. 385/1–10, 15, 385/20, 40, 131; 359/344; 438/31

(56) References Cited

U.S. PATENT DOCUMENTS

| | | | |
|---|---|---|---|
| 5,742,423 A | 4/1998 | Ido et al. | |
| 5,757,833 A | 5/1998 | Arakawa et al. | |
| 6,100,543 A | 8/2000 | Sakata | |
| 6,162,655 A | 12/2000 | Johnson et al. | |
| 6,174,748 B1 | 1/2001 | Jeon et al. | |
| 6,229,947 B1 | 5/2001 | Vawter et al. | |
| 6,278,170 B1 | 8/2001 | Komatsu | |

*Primary Examiner*—Frank G. Font
*Assistant Examiner*—Michael A. Lyons
(74) *Attorney, Agent, or Firm*—RatnerPrestia

(57) ABSTRACT

A monolithic single pass expanded beam mode active optical device includes: a substrate; a waveguide layer coupled to the top surface of the substrate; a semiconductor layer coupled to the waveguide layer; first and second electrodes for receiving an electric signal coupled to the substrate and the semiconductor layer, respectively. The waveguide layer includes a plurality of sublayers, forming a quantum well structure, which is responsive to the electric signal. The waveguide layer has three sections, two expansion/contraction sections and an active section, which extends between and adjacent to the two expansion/contraction sections. The thickness of at least one of the plurality of sublayers varies within the expansion/contraction portions of the quantum well structure. Possible interactions of the active region with the light include: absorption in the case of an electro-absorptive modulator and optical gain.

11 Claims, 16 Drawing Sheets

MONOLITHIC EXPANDED BEAM MODE ELECTROABSORPTION MODULATOR

This invention relates to semiconductor optical devices with quantum well structures. More particularly this invention relates to the monolithic integration of transparent optical mode transformers with an electroabsorption modulator.

BACKGROUND OF THE INVENTION

A typical electroabsorption (EA) modulator is composed of a semiconductor device, which has light coupled into and out of it by two optical fibers. The optimum optical beam profile for efficient modulation is not the same as the optimum optical beam profile for efficient fiber coupling. This is especially true in high speed EA modulators.

If efficient optical coupling into and out of the EA modulator is not achieved, then system performance is degraded owing to excessive optical losses. Likewise, if efficient modulation is not achieved within the EA modulator, then system performance may be degraded owing to poor signal quality. For optimum modulator performance, it is desirable to independently optimize the optical beam profile in the modulation region of the semiconductor device and at the fiber input and output coupling surfaces of the device.

One possible solution is the inclusion of mode expansion/contraction regions, which couple the optical signal into and out of the optical fibers with one optical beam profile, or mode, and couple the optical signal into and out of the modulation region of the semiconductor device with another beam mode.

There have been numerous attempts to independently optimize these sections. One technique, described by Johnson, et. al. (U.S. Pat. No. 6,162,655), uses a beam expansion technique, wherein the transfer of the optical mode from the modulation region to an underlying passive waveguide is through a bumped mode transfer section. The modulation region uses quantum wells optimized for modulation properties of a preselected beam. The underlying waveguide is optimized for beam expansion properties to allow optimum optical modes for both external fiber coupling and modulation.

Some loss at the input and output couplings may be unavoidable, but any optical loss within an EA modulator is highly undesirable. To avoid high optical transition loss between the waveguide and the modulation region, the thicknesses of all the layers in the transition region are desirably carefully controlled. This technique requires a large number of precise fabrication steps.

Another technique for independently optimizing the modulator region from the beam expander region was suggested by Ido, et. al. (U.S. Pat. No. 5,742,423). The application of a "butt-joint" technique is used to achieve independently optimized regions on the modulator. In this technique, the modulation region is defined through etching and the mode expander is selectively grown. The mode transfers directly through the butt joint region between the modulation and mode expander regions. This technique has the advantage of the mode not being transferred vertically within the structure. The optical losses can be kept reasonably low, except for the potential of an abrupt interface with slightly different modal indices at the butt joint. This may cause a reflective loss if the interface is not truly adiabatic. This technique uses regrowth of epitaxial material on an etched structure. Epitaxial growth on etched surfaces can reduce yield due to possible non-uniform growth problems. Also, it can prove difficult to obtain proper mode matching between regions, which may lead to undesirable reflections or scattering.

Arakawa, et. al. (U.S. Pat. No. 5,757,833) disclose a selective area growth method to produce quantum well lasers. An integrated infrared laser and output waveguide, fabricated by this method is disclosed. The output waveguide is both transparent and, through selective area growth, is shaped so as to increase the optical mode size for better mode coupling of the laser output to an optical fiber. Selective area growth techniques limit the absolute amount of enhancement which can be achieved and the degree of transparency attainable in the mode expansion section, while retaining the quality and reliability of the device.

Lasers, such as those disclosed by Arakawa et al., must be concerned with saturable absorber effects, which may lead to non-linearity in the optical output power. For this and other reasons this technique has not widely used in laser devices. The technique of selective area growth of quantum wells is however widely deployed to monolithically integrate lasers with modulators where only a slight enhancement is necessary and the quality can be retained.

In addition, lasers require reflective elements for their operation. Arakawa et al. disclose using the cleaved surfaces of the selective growth areas as reflectors.

SUMMARY OF THE INVENTION

One embodiment of the present innovation is a monolithic single pass expanded beam mode active optical device for light of a predetermined wavelength and a predetermined beam mode. An exemplary a monolithic single pass expanded beam mode active optical device includes: a substrate; a waveguide layer coupled to the top surface of the substrate; a semiconductor layer coupled to the waveguide layer; first and second electrodes for receiving an electric signal coupled to the substrate and the semiconductor layer, respectively.

The waveguide layer includes a plurality of sublayers, forming a quantum well structure, which is responsive to the electric signal. The waveguide layer has three sections, two expansion/contraction sections and an active section, which extends between and adjacent to the two expansion/contraction sections. At least one of the plurality of sublayers varies in thickness within the expansion/contraction portions of the quantum well structure. The active portion of the quantum well structure interacts with light of the predetermined wavelength, responsive to the electric signal. Possible interactions of the active region with the light include: absorption in the case of an EA modulator or optical gain in the case of an SOA.

A further embodiment of the present innovation is a monolithic expanded beam mode EA modulator for modulating light of a predetermined wavelength, responsive to an electric signal. An exemplary monolithic expanded beam mode EA modulator includes: a substrate; a waveguide layer coupled to the substrate; a semiconductor layer coupled to the waveguide layer; and first and second electrodes for receiving the electric signal coupled to the substrate and semiconductor layer, respectively.

The waveguide layer includes a plurality of sublayers, which form a quantum well structure. This quantum well structure includes two expansion/contraction sections and an electroabsorption section. The thickness of at least one of the plurality of sublayers varies within the expansion/contraction sections. Also the expansion/contraction sections have a cutoff wavelength which is shorter than the predetermined wavelength. The electroabsorption section extends between, and adjacent to the two expansion/contraction sections. The cutoff wavelength of electroabsorption section has a first value, which is shorter than the predetermined wavelength, responsive to the on-voltage of the electric signal, and has a second value, which is longer than the predetermined wavelength, responsive to the off-voltage of the electric signal.

Another embodiment of the present invention is method of manufacturing a monolithic expanded beam mode electroabsorption modulator of the first embodiment. The first step of this method is to form the waveguide layer on a portion of the top surface of the substrate by selective area growth. The waveguide layer having: a waveguide index of refraction; an electroabsorption thickness in an electroabsorption portion of the waveguide layer that is greater than the thicknesses in remaining portions of the waveguide layer along the longitudinal axis; and a plurality of sublayers forming a quantum well structure, each of the sublayers including a waveguide material. Next, the semiconductor layer, having a semiconductor layer index of refraction, is formed on the waveguide layer. Then, the waveguide layer and the semiconductor layer are defined and etched to form, along the longitudinal axis: the electroabsorption section and the two expansion/contraction sections disposed on opposite sides of the electroabsorption section. The semiconductor layer is then planarized and first and second electrical contacts are formed on the substrate and the semiconductor layer, respectively.

Another embodiment of the present invention is an optical signal modulation system. An exemplary system contains: a laser to produce a light beam with a predetermined wavelength and oscillating in a first beam mode; an exemplary monolithic expanded beam mode EA modulator; and an optical fiber optically coupled to the monolithic expanded beam mode EA modulator and substantially optimized for low input loss and transmission of light beams oscillating in the first beam mode.

Yet another embodiment of the present invention is an extended range optical communication system. In an exemplary extended range optical communication system, a laser produces a light beam with a predetermined wavelength and a first beam mode. This light beam is optically coupled at the input end and transmitted along a first optical waveguide. The output end is optically coupled to a monolithic expanded beam mode optical amplifier. An exemplary monolithic expanded beam mode optical amplifier includes: an input surface substantially optimized for low input loss of light beams with the first beam mode; an expansion section to expand the beam mode of the light beam for increased confinement of the light beam; an optical amplification section, which includes a semiconductor gain medium for amplifying light of the predetermined wavelength; a contraction section to contract the beam mode of the light beam to about the first beam mode; and an output surface. The amplified light beam is optically coupled a second optical waveguide, which is substantially optimized for low input loss and transmission of light beams with the first beam mode.

Another exemplary embodiment of the present invention is a low-loss demultiplexer for demultiplexing a plurality of temporally offset channels, each of which is modulated at a channel bit rate and temporally offset from the remaining channels by less than a minimum time between bits. The input optical signal source is coupled into a monolithic expanded beam mode EA modulator which may be periodically modulated at the channel bit rate with the temporal offset of one channel of the input signal to select that channel. The resulting single channel signal is then optically coupled to a receiver.

Yet another exemplary embodiment of the present invention is an exemplary low-loss demultiplexer for demultiplexing a time division multiplexed (TDM) optical signal have a plurality of channels, each channel transmitted as blocks which are temporally interleaved with blocks of other channels. The exemplary low-loss demultiplexer includes: an optical beam splitter for splitting the TDM signal; a monolithic expanded beam mode EA modulator to select blocks of a single channel; and a buffer optically coupled to the output surface of the monolithic expanded beam mode electroabsorption modulator to store the selected blocks.

DETAILED DESCRIPTION OF THE INVENTION

One embodiment of the present invention is a monolithic expanded beam mode EA modulator which includes two mode expansion/contraction (E/C) sections and a modulation section formed in a single piece by selective area growth. Additional embodiments include a method of manufacturing, and exemplary uses of a device of this type.

Desirably, an optical modulator waveguide would be designed to have a large optical mode on the input to the chip for optical coupling with minimal transmissive and reflective losses, followed by a tightly confining modulation region to achieve good modulation efficiency, and ending with a large optical output mode to couple to the output fiber with low transmissive and reflective losses. The modal properties of optical waveguides are a function of waveguide thickness. It can be shown that when an optical waveguide becomes thinner, the modal confinement in the waveguide decreases. As described below, this property may be used to design a monolithic expanded beam mode EA modulator.

Figure 1A:
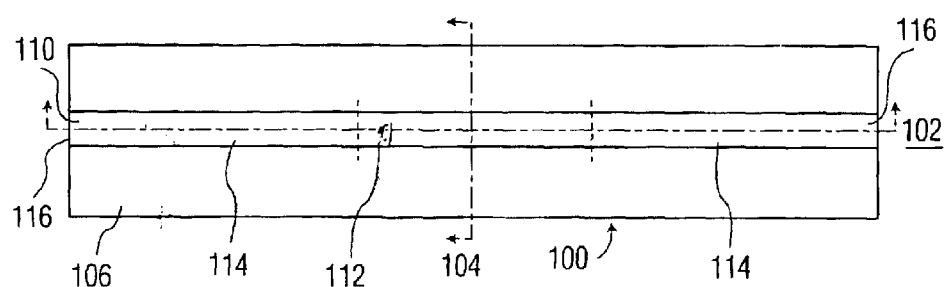
FIG. 1A is a top plan drawing of an exemplary monolithic expanded beam mode device according to the present invention.
Figure 1B:
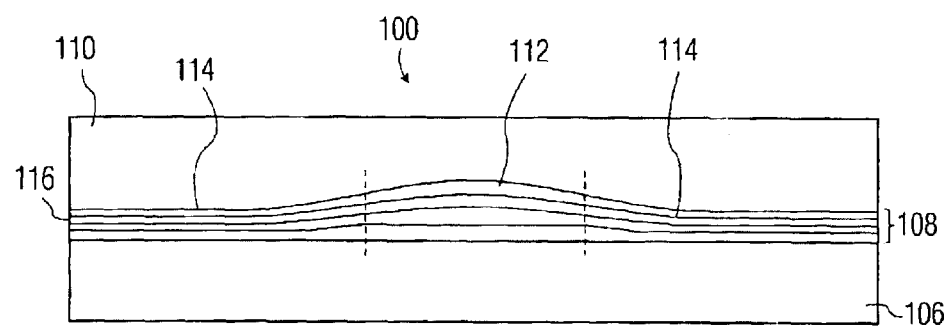
FIG. 1B is a side cut-away drawing of an exemplary monolithic expanded beam mode device according to the present invention.
Figure 1C:
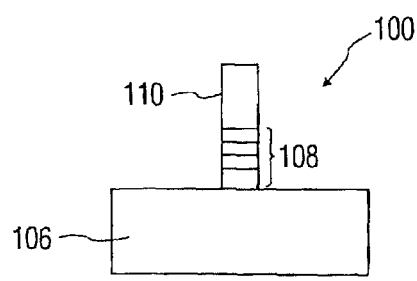
FIG. 1C is a front cut-away drawing of an exemplary monolithic expanded beam mode device according to the present invention.

FIGS. 1A–C illustrate an exemplary embodiment of the inventive modulator. FIG. 1A is a top plan view of the exemplary monolithic expanded beam mode EA modulator 100. Cut line 102 shows the orientation of the side cut-away view of modulator 100 shown in FIG. 1B and cut line 104 shows the orientation of the front cut-away view of modulator 100 shown in FIG. 1C.

Exemplary monolithic expanded beam mode EA modulator 100 is formed with three layers: substrate layer 106; waveguide layer 108; and semiconductor layer 110. Waveguide layer 108 may contain a number of sublayers, as shown. These sublayers form a quantum well structure within this layer. This structure may include a single quantum well, multiple quantum wells, separate confinement layers or a bulk active material. Substrate layer 106 and semiconductor layer 110 may also contain a plurality of sublayer. Additionally, semiconductor layer 110 may desirably function as a cladding layer as well as the p-type material of the P-I-N quantum well structure.

A modulator desirably has a waveguide profile similar to that of waveguide layer 108 in FIG. 1B. It is desirably thin at the input/output surfaces 116 of the modulator chip and thicker in the modulation section 112. The quantum well structure in modulation section 112 is designed to provide modulation at a predetermined working wavelength.

Figure 12A:
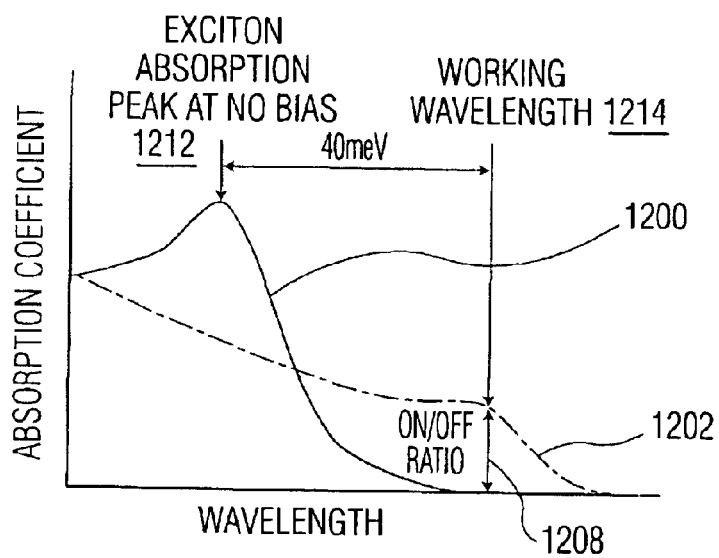
FIG. 12A is a graph illustrating absorption as a function of wavelength for an exemplary unstrained quantum well structure.
Figure 12B:
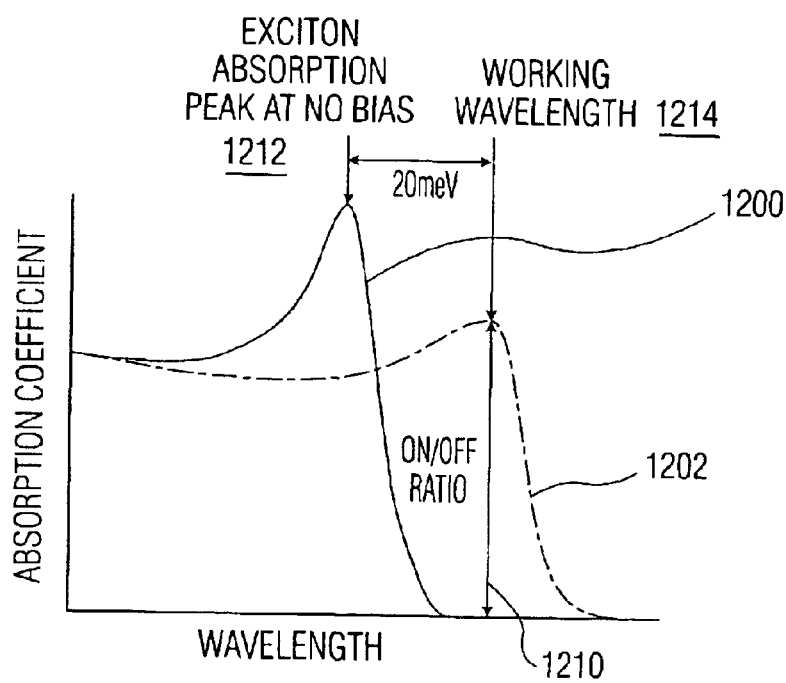
FIG. 12B is a graph illustrating absorption as a function of wavelength for an exemplary strained quantum well structure.

FIGS. 12A and 12B (prior art) illustrate how quantum well EA modulators operate. The graph in FIG. 12A represents an exemplary EA modulator with unstrained quantum well layers and the graph in FIG. 12B represents an exemplary EA modulator with strained quantum well layers. Both are designed to operate at working wavelength 1214. Curves 1200 in the two graphs represent normalized absorption spectra for these quantum well structures with no applied field and curves 1202 represent normalized absorption spectra with a bias voltage applied. As shown in these graphs application of a bias voltage, which may be as small as 2–10 V, moves the absorption peak 1212 to the working wavelength 1214. This transition is extremely fast and modulation rates are generally limited only by the rate at which the bias voltage may be modulated. Signals having bit rates exceeding 40 GHz are possible with such a modulator.

The quantum well structure is desirably designed to maximize the on/off ratio, the normalized height of the biased absorption peak at the working wavelength. Additionally, on/off ratio 1210 representing an exemplary strained quantum well structure may be designed, as shown in FIG. 12B, to be greater than on/off ratio 1208 of a similar, but unstrained, exemplary quantum well structure, as shown in FIG. 12A.

The exemplary operation of EA modulators illustrated in FIGS. 12A and 12B involves modulation between an unbiased, 'on-voltage', and a biased, 'off-voltage', state. It is contemplated, though, that the quantum well structure may be designed differently, allowing an offset of these voltages. For example, on-voltage may be negative and off-voltage unbiased, or both may be positive voltages, as long as the spectral shift of the absorption spectrum provides an adequate on/off ratio. Another important consideration is that cutoff wavelength, the longest wavelength at which significant absorption occurs, may be shorter than the working wavelength for the on-voltage to ensure substantial transparency of the modulator when it is allowing light to pass. Temperature may also affect the device performance.

An exemplary expanded beam mode EA modulator which has a working wavelength of 1.55 $\mu$m, such as shown in FIGS. 1A–1C, may have a band gap in modulation section 112 which corresponds to an absorption peak of 1.51–1.53 $\mu$m. This band gap allows the device to efficiently absorb light when the off-voltage is applied and to pass light through with little absorption when biased at the on-voltage. There is generally some absorption of the working wavelength, when the device is biased at the on-voltage. This absorption amount is a tradeoff in designing the device.

It is possible to form an EA modulator that has a cutoff wavelength sufficiently short to eliminate substantially all absorption at the on-voltage bias, but this may require an undesirably large voltage difference for modulation. One may, however, form passive waveguides that have such a cutoff wavelength in E/C sections 114. A property of quantum wells which may be exploited to assist with this issue is that, as the thickness of the quantum well increases, the band gap or energy of the absorption peak decreases. This corresponds to a significant decrease in the cutoff wavelength of light absorbed by the quantum well structure.

By using selective area growth it is possible to grow a single multi-layer quantum well structure of varying thickness, and thus having a varying cutoff wavelength. Therefore, the thickness of waveguide layer 108 can easily be modified through the use of selective area growth, which is described below with reference to FIG. 2. This allows the band gap of the E/C sections 114 to be increased, by decreasing the thickness of the sublayers. Increasing the band gap of the quantum wells in these sections effectively makes the quantum wells transparent to the working wavelength for both the on and the off-voltage. The use of selective area growth techniques allows the thickness of E/C sections 114 to vary from a minimum at input/output surfaces 116 to a maximum at the thickness of modulator section 112. The entire waveguide layer 108 may be formed as a single unit, the sublayers of the quantum well structure stretching continuously from one I/O surface 116 to the other. Using selective area growth techniques, E/C sections of 75 μm, or longer, may be formed, which have a continuously varying thickness. The thickness variation in the E/C sections may be desirably gentle enough to allow the beam modes to expand and contract adiabatically. This adiabatic expansion and contraction, coupled with the monolithic construction, diminishes the possibility of scattering losses within exemplary expanded beam mode EA modulator 100.

The structure of both the quantum wells and the thickness profile may be closely controlled. Enhancements of 2.5 times in the thickness of modulator section 112 over E/C section 114 may be achieved. The designed enhancement is desirably sufficient to maintain an absorption peak in the bulk of the mode E/C section far enough from the working wavelength to ensure substantial transparency, for example, 40 nm or more from the working wavelength.

For an exemplary 1.55 μm expanded beam EA modulator, modulation section 112 may be designed with an on-voltage absorption peak, corresponding to peak 1212 in FIG. 12B, of 1.52–1.53 μm and E/C section 144 may be designed with an on-voltage absorption peak of <1.51 μm substantially throughout. For an exemplary 1.32 μm expanded beam EA modulator, modulation section 112 may be designed with an on-voltage absorption peak of 1.29–1.30 μm and expansion/contraction section 144 may be designed with an absorption peak of <1.28 μm substantially throughout.

Figure 2:
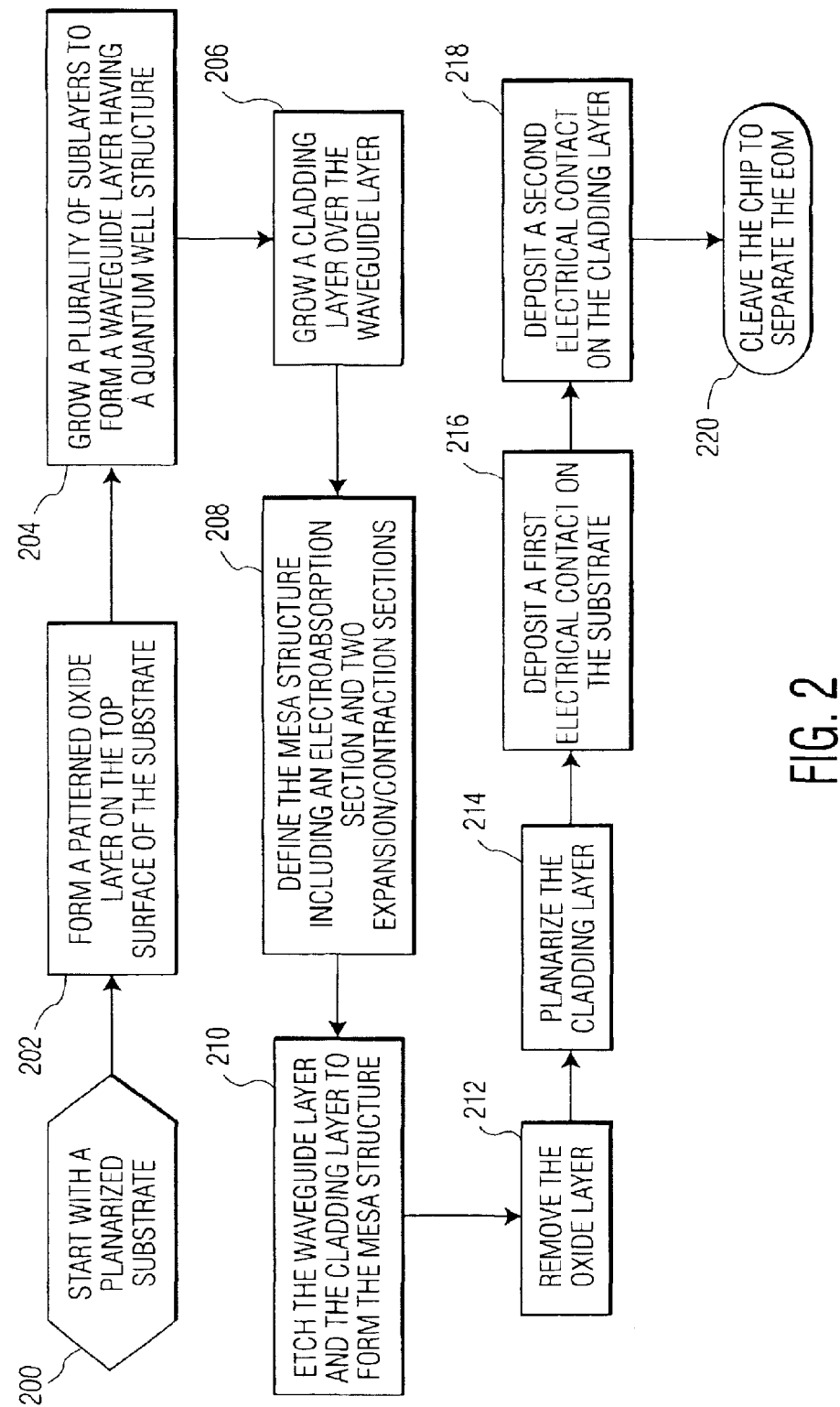
FIG. 2 is a flowchart illustrating an exemplary method of manufacture of the monolithic expanded beam mode device of FIGS. 1A–1C.

FIG. 2 is a flowchart describing an exemplary selective area growth technique for producing exemplary expanded beam mode EA modulator 100 from FIGS. 1A–1C. FIGS. 3A–C, 4A–C, and 5A–C illustrate various steps of this exemplary fabrication process.

The process begins with a substrate, step 200. Substrate 106, shown in FIG. 3, may function as both a cladding layer to assist in containment of the beam in the device and as the N layer of the P-I-N quantum well structure. (Although this description assumes that the substrate is the N side of the P-I-N structure, one skilled in the art will understand that the substrate could be the P side with the semiconductor layer 110 formed of N-type material instead.) The substrate is preferably formed of a III/V semiconductor, such as InP, GaAs, or InGaAsP. The substrate may also be formed of multiple layers such as GaAs grown on silicon or alumina.

Figure 3A:
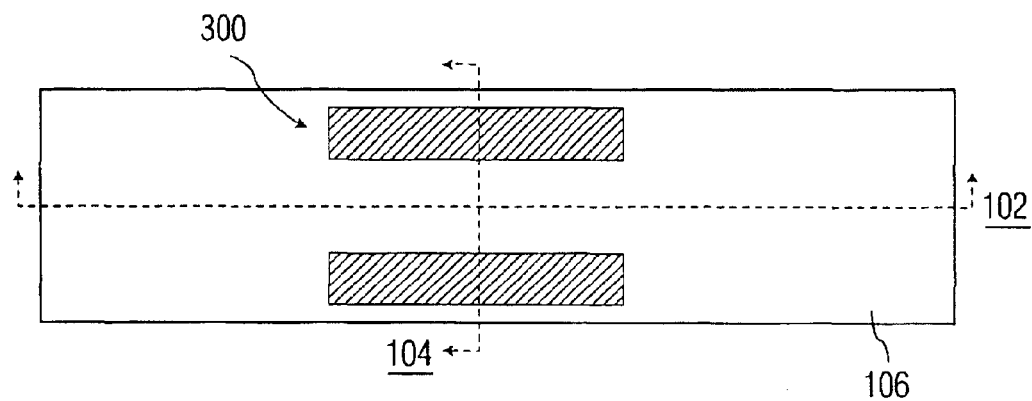
FIGS. 3A, 4A, and 5A are top plan drawings of an exemplary monolithic expanded beam mode device during manufacture according to the flowchart of FIG. 2.
Figure 3B:
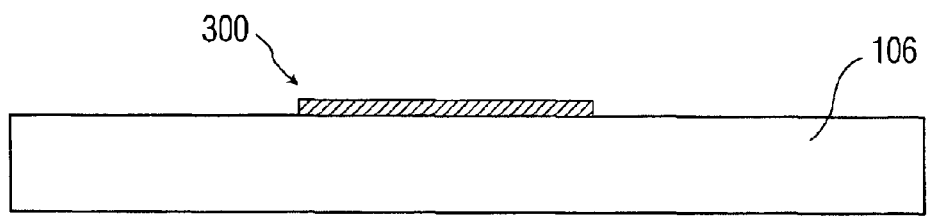
FIGS. 3B, 4B, and 5B are side cut-away drawings of an exemplary monolithic expanded beam mode device during manufacture according to the flowchart of FIG. 2.
Figure 3C:
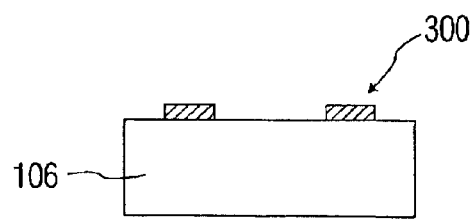
FIGS. 3C, 4C, and 5C are front cut-away drawings of an exemplary monolithic expanded beam mode device during manufacture according to the flowchart of FIG. 2.

A patterned growth-retarding layer is formed on the top surface of the substrate, step 202. Materials which retard growth of III/V materials, such as SiN or $SiO_2$, make up the growth-retarding layer. The growth-retarding layer may be formed and patterned using any standard techniques known in the semiconductor industry. FIGS. 3A–C show the wafer at this point in the fabrication process. Patterned growth-retarding layer 300 is shown in FIG. 3A as two rectangular regions with a channel between disposed along longitudinal axis 102 (also the cut line for the cutaway view in FIG. 3B). For an exemplary expanded beam EA modulator 2 μm wide, a 15 to 20 μm channel is desirable to provide substantial flatness of the layers in a transverse direction. Depending on the profile desired for the waveguide layer, other patterns, such as paired trapezoids or triangles, may be used. A larger number of regions may also be used.

Figure 4A:
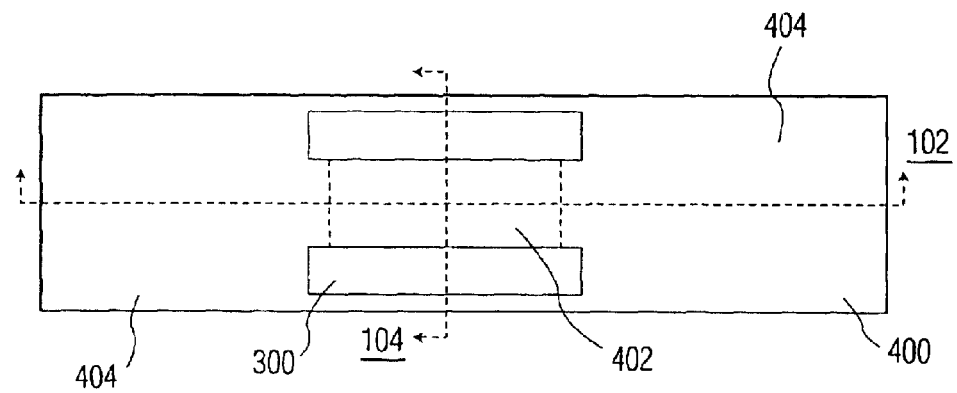
Figure 4B:
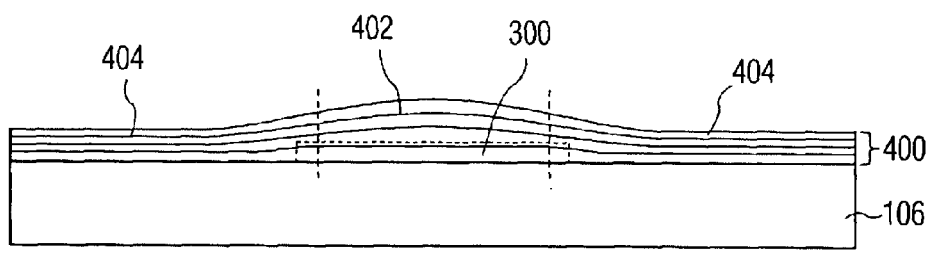
Figure 4C:
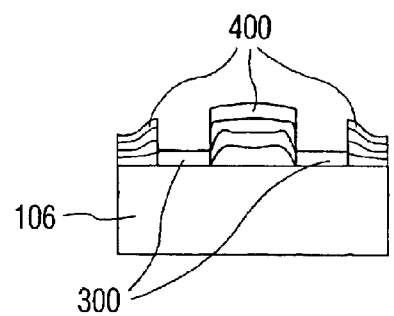

Next a plurality of sublayers making up the waveguide layer are grown, step 202. Metal organic chemical vapor deposition (MOCVD) is the preferred method for deposition of the waveguide sublayers, but other epitaxial deposition techniques may also be employed, such as molecular beam epitaxy (MBE) and chemical beam epitaxy (CBE). Near the growth-retarding regions the growth rate is enhanced owing to gas phase diffusion and surface diffusion of the reactants in the MOCVD reactor away from growth-retarding regions 300. The quantum wells layers thus deposited 400, as shown in FIGS. 4A–C, are made thicker in the modulation section 402 of the device owing to the growth-retarding masks. An exemplary quantum well structure, for use with typical optical communication signals, may be designed have an unbiased absorption peak approximately 0.01 μm longer in the central modulation section than in mode expansion sections 404. For example, a 1.55 μm modulator may designed such that the quantum wells attain an absorption peak at 1.52–1.53 μm in central region 402, and a peak <1.51 μm in the mode expansion sections 404.

The quantum wells and barriers are preferably composed of $In_xGa_{(1-x)}As_yP_{(1-y)}$ materials as well as $In_xAl_yGa_{(1-x)}As_{(1-y)}$ and $In_xGa_{(1-x)}As$ materials. Specific selections of x and y are dependent on the desired bandgap and strain, if any, desired. These sublayers may also be formed by other permutations of alloys formed from these elements. The quantum wells and barriers desirably have a sufficiently larger-refractive index than that of substrate 106 so that the quantum wells and barriers act as a waveguide.

Figure 5A:
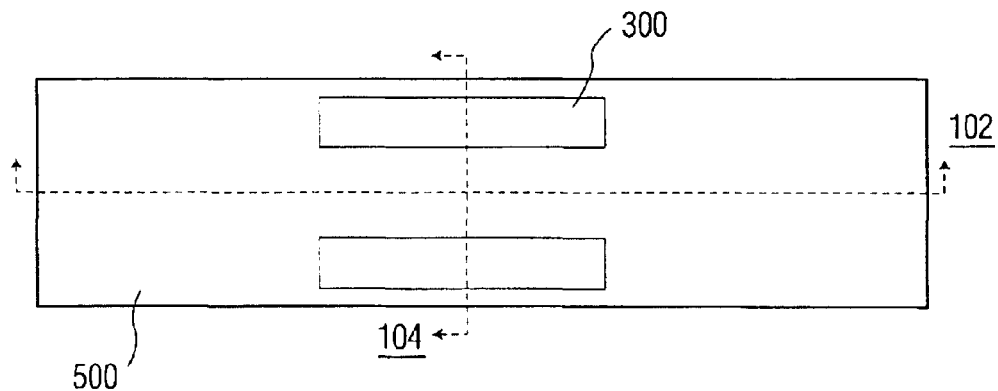
Figure 5B:
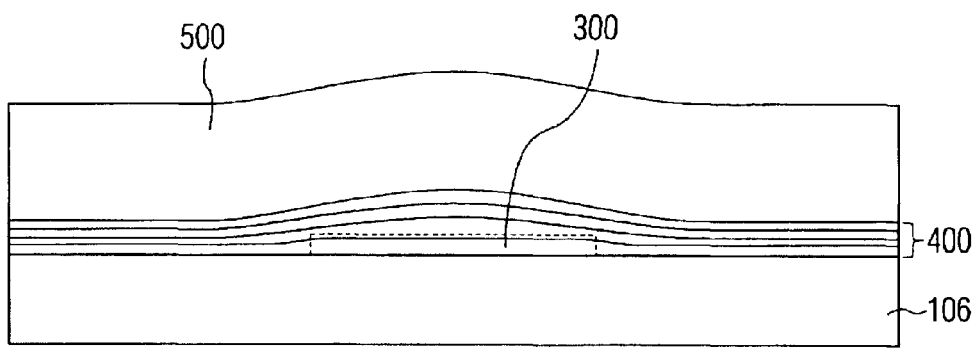
Figure 5C:
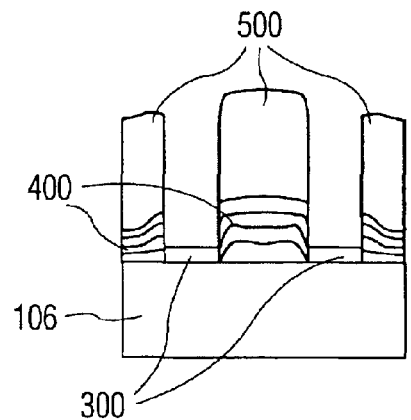

Next a cladding layer is formed over the waveguide layer, step 206. This step of the fabrication process is illustrated in FIGS. 5A–C. Preferably, cladding layer 500 is formed using the same method as the waveguide layer. The cladding layer desirably has a refractive index lower than waveguide layer 400, preferably similar to that of substrate 106, to ensure light containment. Additionally, the cladding layer may be formed of a P type material, preferably P-type InP or GaAs. Also, the cladding may be formed in multiple sublayers.

Step 208 defines the mesa structure of the expanded beam mode EA modulator. The mesa includes the EA modulation section and two E/C sections of the waveguide and cladding layers. This mesa may be straight, as shown in FIGS. 1A and 1C, or laterally tapered to further enhance mode coupling into the fiber. Next these layers are etched to form the mesa structure, step 210, and growth-retarding layer 300 is removed, step 212. Although step 212 is shown following step 210 in FIG. 2, it is contemplated that step 212 could alternatively take place between steps 204 and 206 or after any of steps 214, 216, 218, or 220. Additionally, step 212 could be skipped entirely if the growth-retarding layers do not interfere with the operation of expanded beam mode EA modulator 100.

Once the mesa is formed, the cladding layer is planarized, step 214, p and n type ohmic contacts are deposited on the cladding layer and substrate layer respectively, and the device may be cleaved to form exemplary expanded beam mode EA modulator 100 illustrated in FIGS. 1A–C. Steps 208, 210, 212, 214, 216, 218, and 220 may be carried out by any of a number of standard semiconductor fabrication techniques known to those skilled in the art.

Figure 15:
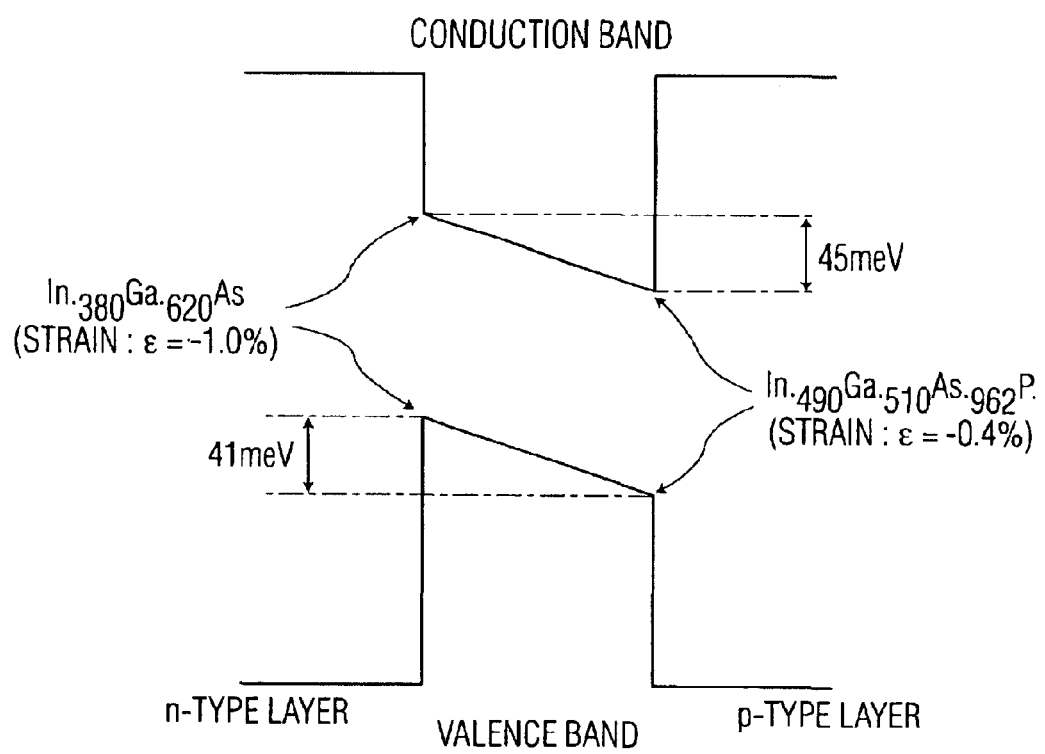
FIG. 15 is a band diagram illustrating an exemplary strain quantum well structure.

FIG. 15 shows one possible band gap diagram of a single quantum well structure in which both the group III and group V components are changed, which may be employed in an exemplary expanded beam mode EA modulator according to the present invention. The composition of this exemplary well structure is linearly varied for both of the group III and V from $In_{.380}Ga_{.620}As$ (strain: −1.0%) on the n-InP substrate side to $In_{.490}Ga_{.510}As_{.962}P_{.038}$ (strain: −0.4%) on the p-region side (also InP). This exemplary structure yields a bandgap wavelength of about 1.51 μm.

Figure 11A:
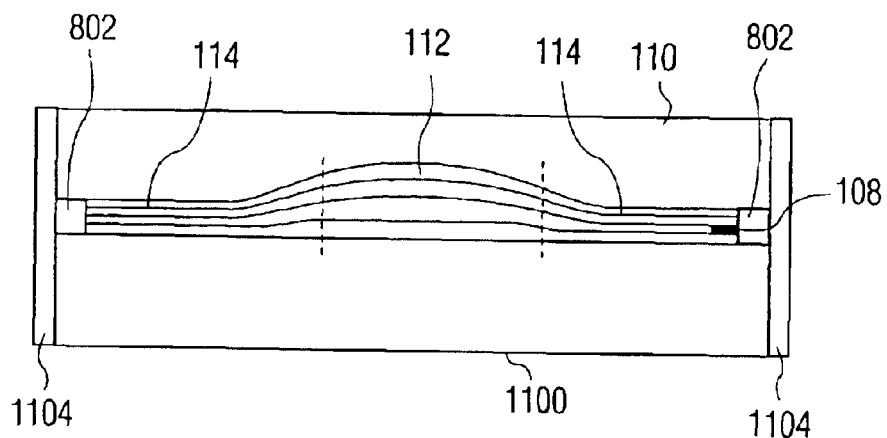
FIG. 11A is a side plan drawing of an alternative exemplary monolithic expanded beam mode device fabricated according the flowchart of FIG. 6.
Figure 11B:
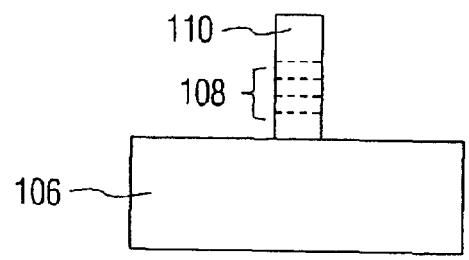
FIG. 11B is a front plan drawing of an alternative exemplary monolithic expanded beam mode device fabricated according the flowchart of FIG. 6.

FIGS. 11A and 11B illustrate another exemplary expanded beam mode EA modulator 1100. Exemplary expanded beam mode EA modulator 1100 includes a recessed I/O window 802 and anti-reflection (AR) coating 1104. Recessing the I/O surfaces of waveguide layer 108 within semiconductor layer 110 may provide improved light coupling by reducing reflections, and may reduce fabrication losses during cleaving. AR coating 1104 improves light coupling by reducing reflections.

Figure 6:
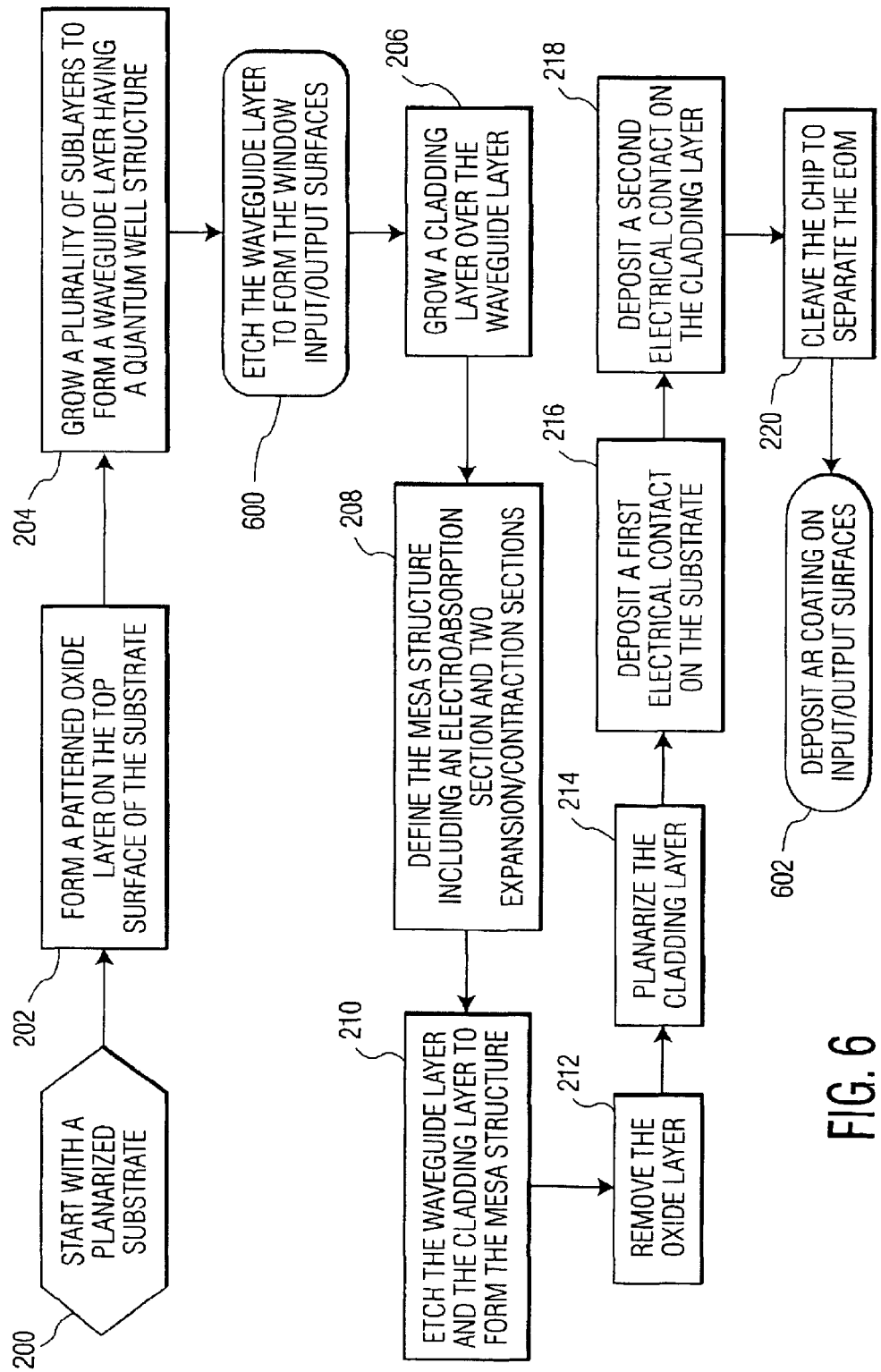
FIG. 6 is a flowchart illustrating an exemplary method of manufacture of an alternative exemplary monolithic expanded beam mode device according to the present invention.

FIG. 6 is a flowchart including two addition alternative steps in the expanded beam mode EA modulator fabrication process of FIG. 2. These two alternative fabrication steps may be used to provide the recessed I/O window 802 and anti-reflection (AR) coating 1104, illustrated in FIGS. 11A and 11B. This method of manufacture is otherwise identical to that just described. FIGS. 7A–B, 8A–B, 9A–B, 10A–B, and 11A–B follow this process. In FIGS. 7A–B, 8A–B, 9A–B, and 10A–B illustrate the formation of two exemplary expanded beam mode EA modulators formed side by side on a wafer.

Figure 7A:
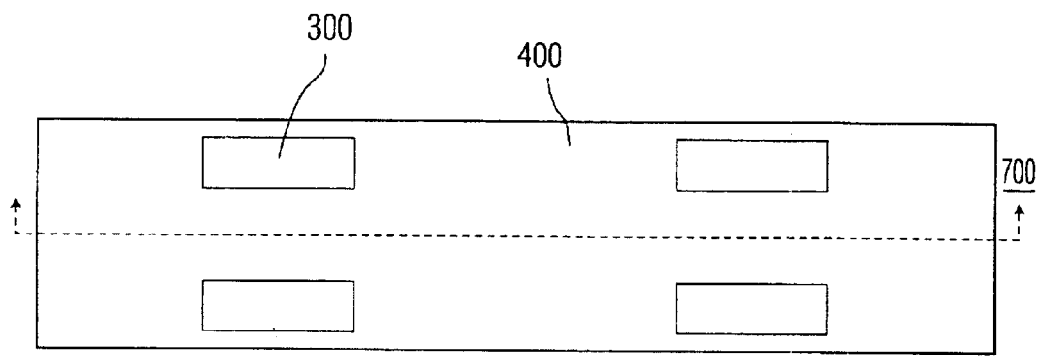
FIGS. 7A, 8A, 9A, and 10A are top plan drawings of an exemplary monolithic expanded beam mode device during manufacture according to the flowchart of FIG. 6.
Figure 7B:
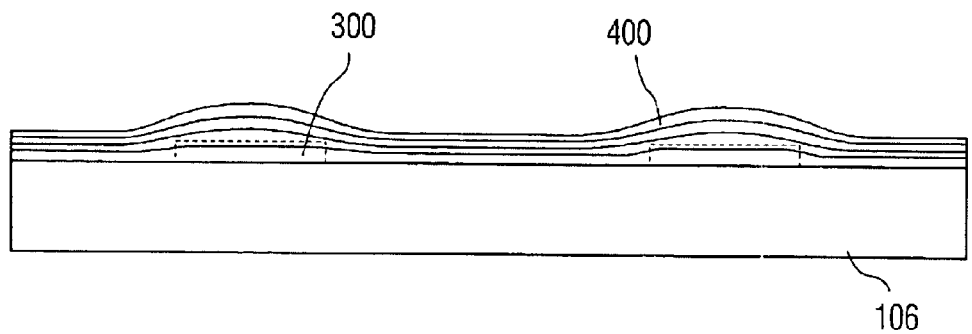
FIGS. 7B, 8B, 9B, and 10B are side cut-away drawings of an exemplary monolithic expanded beam mode device during manufacture according to the flowchart of FIG. 6.
Figure 8A:
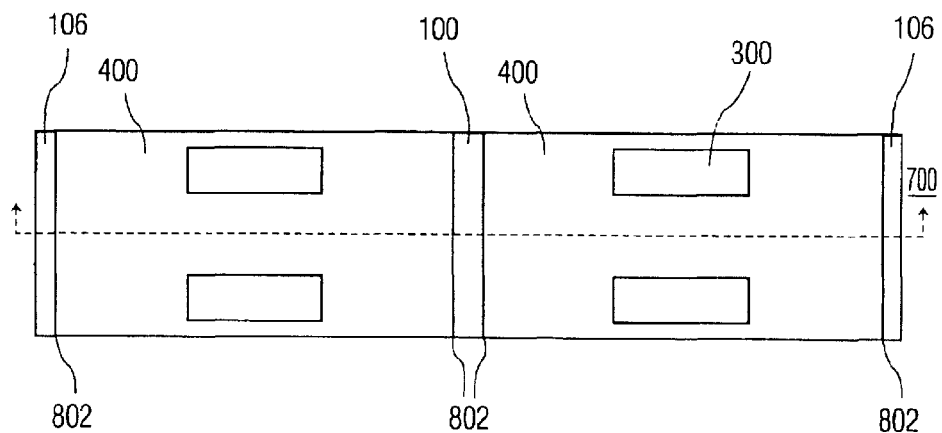
Figure 8B:
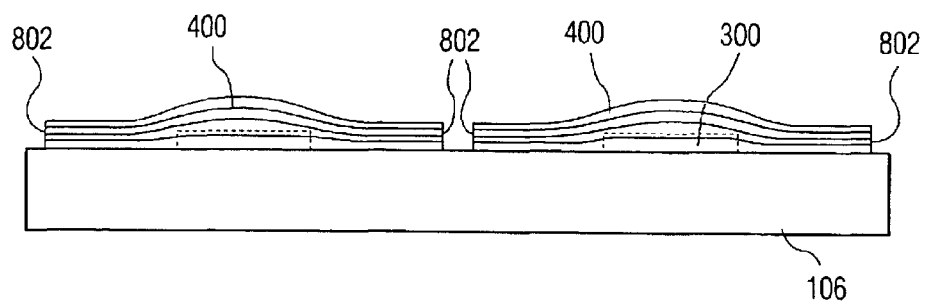

FIGS. 7A and 7B illustrate the fabrication process after steps 200, 202, and 204 in FIG. 6. Patterned growth-retarding regions 300 and waveguide layer 400 are shown deposited on substrate 106 as in FIGS. 4A–C. Next the waveguide layer 400 is etched to expose substrate 106, step 600, forming windows for I/O surfaces 802. FIGS. 8A and 8B illustrate this step. These I/O surfaces may be defined and etched by any standard semiconductor fabrication method which produces a sufficiently planar surface.

Figure 9A:
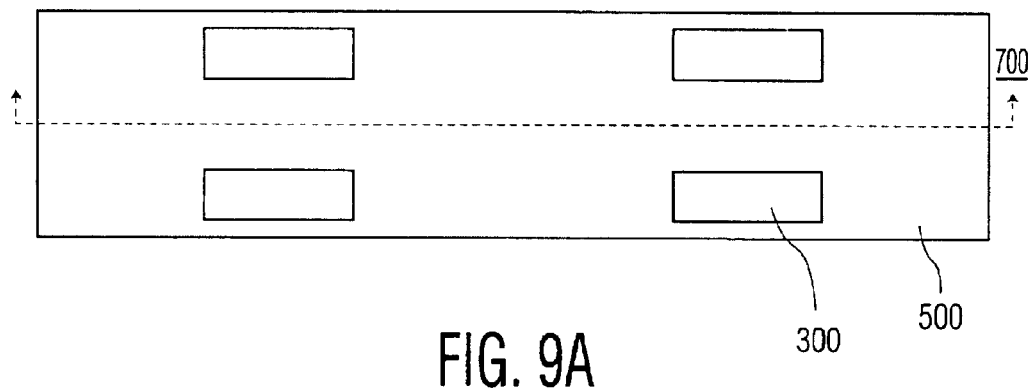
Figure 9B:
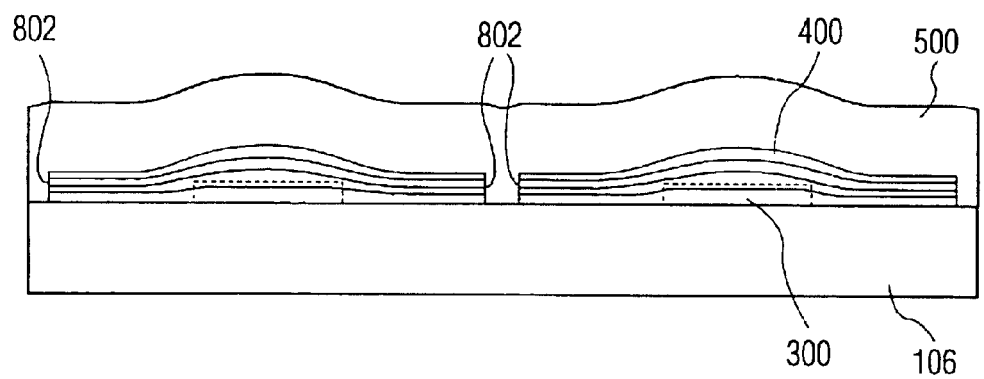
Figure 10A:
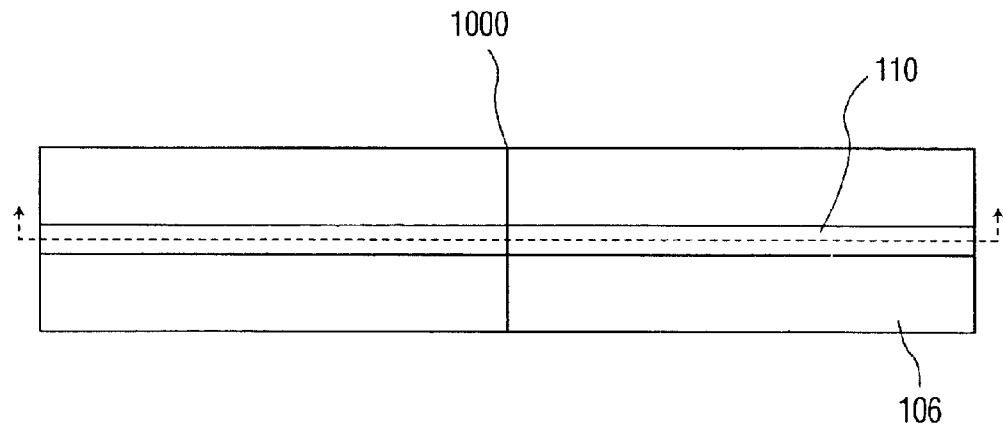
Figure 10B:
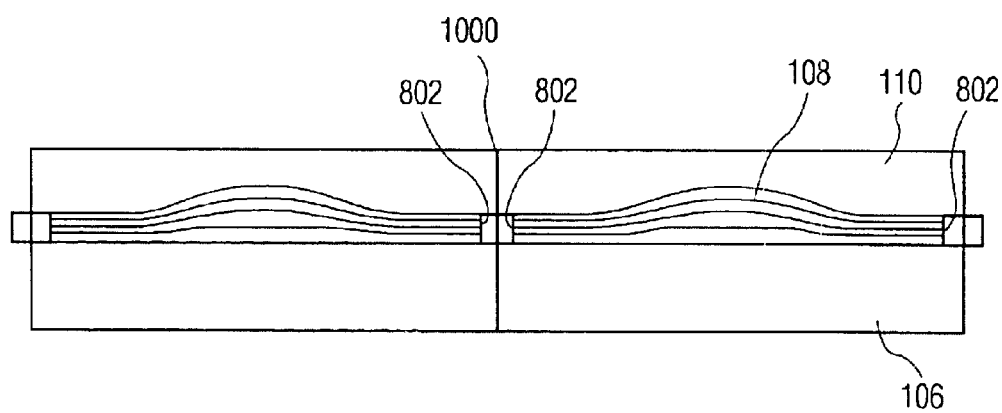

The process of FIG. 6 is then continued as in FIG. 2 through steps 206, 208, 210, 212, 214, 216, and 218. FIGS. 9A and 9B illustrates the device in process following step 206 and FIGS. 10A and 10B show the device in process following step 214. FIGS. 10A and 10B show an exemplary position for cleavage line 1000 for step 220, cleaving the device. This line desirably falls within the window between recessed I/O surfaces 802.

The final step, step 602 in FIG. 6 is the deposition of AR coating 1104 on the cleaved surfaces. This deposition may be accomplished by a number of methods known to those skilled in the art, such as vapor phase deposition or sputtering.

It is noted that either of the alternative processing steps shown in FIG. 6, steps 600 and 602, may be added individually to the more basic exemplary process shown in FIG. 2.

Another embodiment of the present invention is a monolithic expanded beam mode semiconductor optical amplifier (SOA). An SOA may be formed as a wave-guide structure that includes a semiconductor gain medium which may be bulk or a quantum well structure. The SOA operates as a traveling wave amplifier and may be used to increase the output power of a laser. In an optical communication system, an SOA may be used to boost a weakened optical signal along an extended fiber. In this way, the distance over which an optical signal may be transmitted without having to be received and re-transmitted can be increased. It is desirable to confine as much of the optical signal within the gain medium as possible to provide efficient amplification. Because any coupling losses will also reduce the effective gain of an SOA, it is obviously desirable to optimize the optical coupling of the SOA as well.

Therefore, an SOA, like an optical modulator, would desirably be designed to have a large optical mode on the input to the chip for good optical coupling, followed by a tightly confining amplification region to achieve efficient amplification, and ending with a large optical output mode to couple to the output fiber with low loss. An exemplary monolithic expanded beam mode SOA may be produced by the exemplary processes of FIG. 2 or 6. Such a device is similar to the previously described monolithic expanded beam mode EA modulator of either FIGS. 1A–C or FIGS. 11A–B with the difference being in waveguide layer 108 (which are grown in step 204 of the processes). Specifically, this layer may be formed of either a plurality of sublayers forming a quantum well structure or a bulk gain material. If waveguide layer 108 is formed as a quantum well structure, then in section 112 of FIGS. 2A–B and 11 the thickness and composition of the waveguide sublayers are substantially optimized to provide a gain medium, rather than a tunable absorption medium quantum well structure. Also, the inclusion of AR coating 1104 may be desirable for a monolithic expanded beam SOA to reduce the possibility of oscillation.

Figure 13:
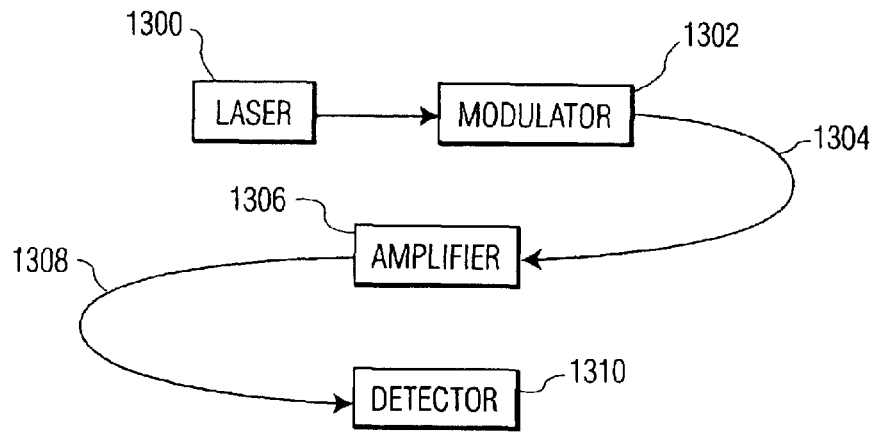
FIG. 13 is a block diagram illustrating an exemplary extended range optical communications system.

The range over which an optical signal can be transmitted in such a system is limited by losses within optical fibers. Efficient modulation of the signal with low loss and a high signal to noise ratio can help, but eventually fiber losses render the signal undetectable. One solution is to detect the signal before it becomes undetectable and then retransmit the signal. This slows the overall transmission speed of the system and may introduce errors. FIG. 13 illustrates an exemplary extended range fiber optic communication system, which employs a monolithic expanded beam mode EA modulator, modulator 1302, to provide efficient modulation, and a monolithic expanded beam mode SOA, amplifier 1306, to extend the range between retransmissions.

Laser 1300, which provides input light to the system, may be either a CW or mode-locked laser, but is preferably a fiber-coupled, CW diode laser. The light from laser 1300 is coupled into monolithic expanded beam mode EA modulator 1302, which modulates the light to create the input signal for the system. This signal is then coupled into, and transmitted through, first optical fiber 1304, preferably a low-loss single mode fiber. The signal is next coupled into monolithic expanded beam mode SOA 1306, where the signal is amplified to compensate for losses which have occurred during transmission. The amplified signal is then coupled into, and transmitted through, second optical fiber 1308. The signal is finally detected by detector 1310.

In this way, the range at which a signal may be transmitted through the fiber optic communication system, without having to detect the signal and retransmit it, may be increased. Additional amplifier and optical fiber stages may be added to further extend the range of the fiber optic communication system. Although the preferred system would employ both a monolithic expanded beam mode EA modulator and a monolithic expanded beam mode SOA's designed according to the present invention, either may be used alone within such a system.

Another feature of optical communications systems is the ability to multiplex a number of signals and simultaneously transmit these signals along the same optical fiber. To realize this advantage an optical communications system needs a method of multiplexing and demultiplexing the signals. As with other components in an optical communications system, it is desirable that the multiplexers and demultiplexers operate efficiently with low loss. In the case of temporally multiplexed signals, which contains a number of separate signals each temporally offset to modulate out of phase with the other signals, it is also desirable for the demultiplexer to operate at high speed to maintain a high-bit rate for the signals.

Figure 14A:
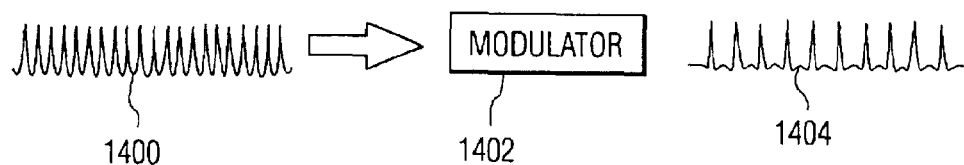
FIGS. 14A and 14B are block diagrams illustrating an exemplary demultiplexer for temporally offset signals.
Figure 14B:
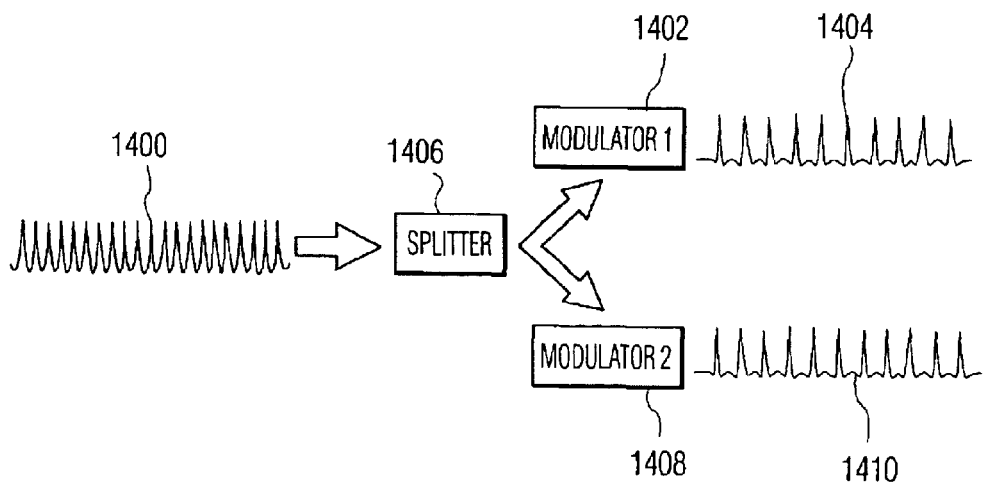

Another exemplary embodiment of the present invention, illustrated in FIGS. 14A and 14B, is the use of a monolithic expanded beam mode EA modulator, constructed according to the present invention, as a demultiplexer for temporally multiplexed optical signals. As shown in FIG. 14A, temporally multiplexed signal 1400 is coupled into monolithic expanded beam mode EA modulator 1402. Modulator 1402 is synchronized with one of the individual signals which make up multiplexed signal 1400 to transmit only the portions of multiplexed signal 1400 which make up the selected signal. The resulting output is demultiplexed signal 1404. FIG. 14B illustrates a complete demultiplexer for demultiplexing two temporally multiplexed signals. First multiplexed signal 1400 is split into two beams by splitter 1406. The beams, still containing the multiplexed signals, are then coupled into monolithic expanded beam mode EA modulators 1402 and 1408. Modulator 1402 is synchronized to first demultiplexed signal 1402 and modulator 1408 is synchronized to second demultiplexed signal 1410. Temporal demultiplexers for multiplexed signals containing 3 or more signals may be constructed in a similar manner.

Figure 16:
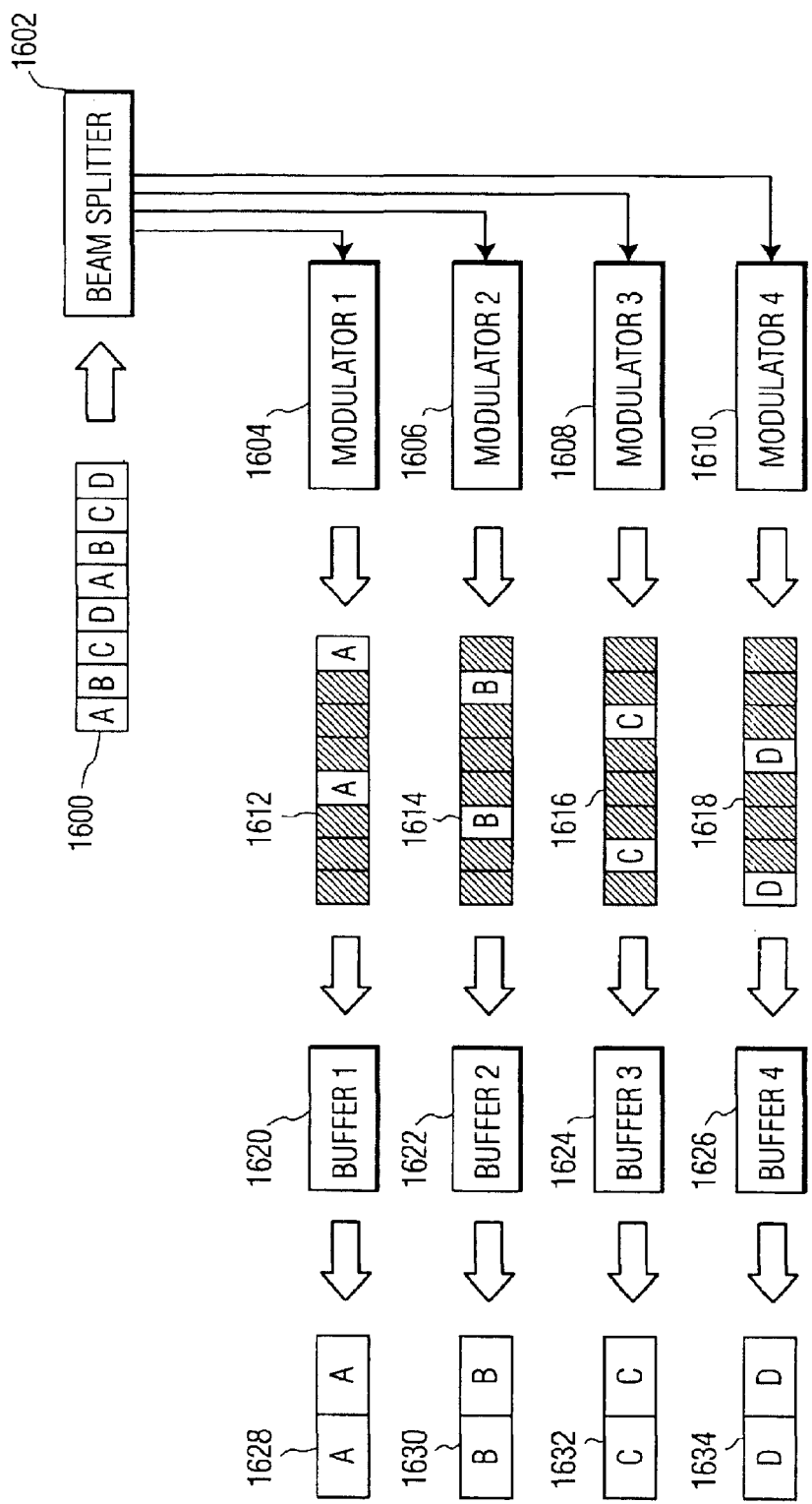
FIG. 16 is a block diagram illustrating an exemplary demultiplexer for TDM signals.

FIG. 16 illustrates another exemplary embodiment of the present invention as a demultiplexer for a time division multiplexed (TDM) optical communication system. The exemplary demultiplexer is illustrated for a four compressed channels (labeled A, B, C, and D), but it is noted that other numbers of channels may be demultiplexed in a similar manner.

In this exemplary demultiplexer, TDM signal 1600 is coupled to beam splitter 1602 which splits the signal into four substantially identical signals. The split signals are fed into monolithic expanded beam mode EA modulators 1604, 1606, 1608, and 1610. These four modulators are operated to transmit only blocks containing information for a single compressed channel. For example, modulator 1604 transmits only blocks of compressed channel A, signal 1612, and stops the blocks of the other channels. Modulators 1606, 1608, and 1610, likewise, transmit compressed single channel signals 1614, 1616, and 1618, respectively. The four compressed single channel signal are then each loaded into a buffer: compressed channel A signal 1612 into channel A buffer 1620; compressed channel B signal 1614 into channel B buffer 1622; compressed channel C signal 1616 into channel C buffer 1624; and compressed channel D signal 1618 into channel D buffer 1626. The compressed signals stored in these buffers are then decompressed and spliced to be transmitted as single channel signals 1628 (channel A), 1630 (channel B), 1632 (channel C), and 1634 (channel D). It is desirable for the single channel signals to be decompressed enough that their blocks may be spliced into a continuous signal, but it is possible that the signals may not be completely decompressed by the buffer.

It is noted that, by using the selective area growth processes described above, a number of coupled expanded beam mode active optical devices may be monolithically fabricated together with adiabatic beam mode conversion E/C sections to reduce coupling losses. Passive optical components, such as a waveguide beam splitter, may also be monolithically integrated in the same way. For example an SOA section could be added in front of the EA modulation section to provide a stronger modulated signal. A monolithic amplified modulator of this type may be particularly useful in a demultiplexer application, such as those described above.

Figure 17A:
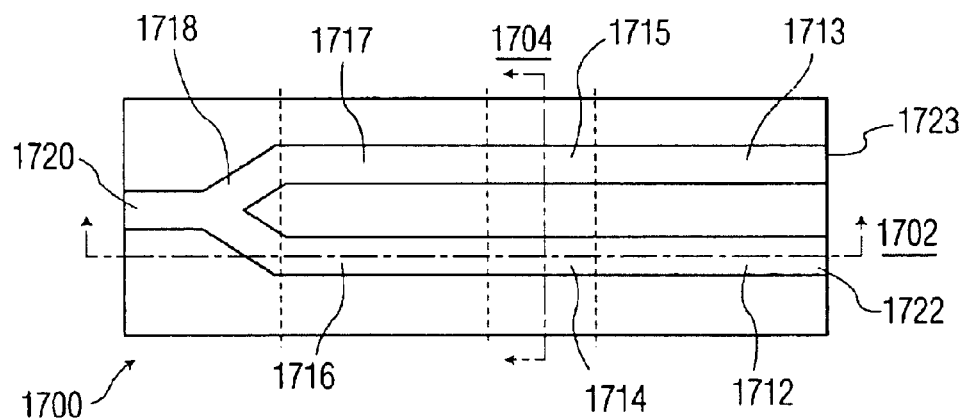
FIG. 17A is a top plan drawing of an exemplary multi-device monolithic multiplexer/demultiplexer according to the present invention.
Figure 17B:
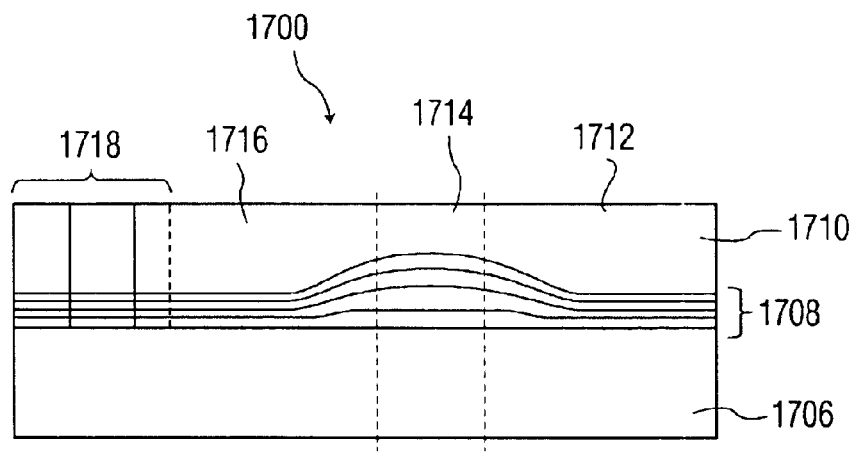
FIG. 17B is a side cut-away drawing of an exemplary multi-device monolithic multiplexer/demultiplexer according to the present invention.
Figure 17C:
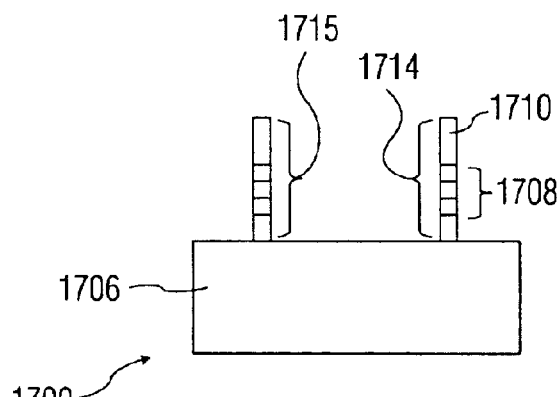
FIG. 17C is a front cut-away drawing of an exemplary multi-device monolithic multiplexer/demultiplexer according to the present invention.

FIGS. 17A–C illustrate exemplary multi-device monolithic multiplexer/demultiplexer (mux/demux) 1700. Cut lines 1702 and 1704 in the top plan drawing of FIG. 17A show the position and orientation of the cut-away drawings of FIGS. 17B and 17C, respectively. Exemplary multi-device monolithic mux/demux 1700 is formed in three layers: substrate 1706; waveguide layer 1708, and semiconductor layer 1710; as the single devices described above.

When used as a demultiplexer, the multiplexed signal is coupled into exemplary multi-device monolithic mux/demux 1700 at I/O surface 1720. The input multiplexed signal is then split in waveguide beam splitter 1718 forming two desirably identical multiplexed signals. The beam modes of these two multiplexed signals are expanded as they pass through separate E/C sections 1716 and 1717. The multiplexed signals are modulated in EA modulation sections 1714 and 1715 to transmit a different one of the constituent signal from each. The beam modes of the demultiplexed signals are contracted in E/C sections 1712 and 1713 for efficient optical coupling through I/O surfaces 1722 and 1723.

When used as a multiplexer, separate light beams are coupled into exemplary multi-device monolithic mux/demux 1700 at I/O surfaces 1722 and 1723. The beam modes of these two input light beams are expanded as they pass through separate E/C sections 1712 and 1713. These input light beams are then separately modulated in EA modulation sections 1714 and 1715 to transmit separate constituent signal from each. The beam modes of the two constituent signals are contracted in E/C sections 1716 and 1717. The two constituent signals are combined in waveguide beam splitter 1718 forming a multiplexed signal. The contracted beam mode of the multiplexed signal is desirably optimized for efficient optical coupling through I/O surface 1720.

The device illustrated in FIGS. 17A–17C is designed to multiplex and demultiplex time domain multiplexed signals, such as temporally offset signals or TDM signals. It is noted that the two EA modulator sections 1714 and 1715 may be optimized to different wavelengths allowing the device to be used for wavelength multiplexing as well. It is also noted that, although illustrated exemplary multi-device monolithic mux/demux 1700 is designed for multiplexed signals having two constituent signals, a similar device may be constructed for multiplexed signals having a larger number of constituent signals.

Although the embodiments of the invention described above have been in terms of EA modulators and SOA's, it is contemplated that similar concepts may be practiced with other optical components. Also, it will be understood to one skilled in the art that a number of other modifications exist which do not deviate from the scope of the present invention as defined by the appended claims.

What is claimed:

1. A monolithic single pass expanded beam mode active optical device for light of a predetermined wavelength and a predetermined beam mode, comprising:

a substrate including a top substrate surface;

a waveguide layer coupled to the top surface of the substrate and including;

a semiconductor gain medium;

two expansion/contraction sections, each including a portion of the semiconductor gain medium which is substantially transparent to light of the predetermined wavelength wherein, at least a portion of the semiconductor gain medium varies in thickness within said expansion/contraction portion of the expansion/contraction section; and an active section extending between the two expansion/contraction sections the active section including se active portion of the semiconductor gain medium which interacts with light of the predetermined wavelength, responsive to the electric signal;

a semiconductor layer coupled to the waveguide layer;

a first electrode coupled to the substrate; and a second electrode coupled to the semiconductor layer, wherein the first and second electrodes are configured to receive the electric signal.

2. A monolithic expanded beam mode active optical device according to claim 1, wherein the semiconductor gain medium is a bulk active semiconductor material.

3. A monolithic expanded beam mode active optical device according to claim 1, wherein the semiconductor gain medium is a quantum well structure formed of a plurality of sublayers of semiconductor material.

4. The monolithic expanded beam mode active optical device of claim 3, wherein:

the waveguide layer further includes;
two input/output surfaces, each substantially perpendicular to the top substrate surface;
a longitudinal axis extending between and substantially perpendicular to the two input/output surfaces;
each of the plurality of sublayers extends;
substantially parallel to the top surface of the substrate in a direction perpendicular to the longitudinal axis; and
from one of the two input/output surfaces to an other one of the two input/output surfaces; and
each of the two expansion/contraction sections and the electroabsorption section extend along the longitudinal axis adjacent to one of the two input/output surfaces.

5. A monolithic expanded beam mode electroabsorption modulator for modulating light of a predetermined wavelength, including a quantum well structure responsive to an electric signal having an on-voltage and an off-voltage, comprising:

a substrate including a top substrate surface;

a waveguide layer coupled to the top surface of the substrate and including;

two expansion/contraction sections, each including a plurality of sublayers, which form the quantum well structure, wherein the quantum well structure in the expansion/contraction sections has a thickness which varies within said expansion/contraction section and defines an expansion/contraction cutoff wavelength which is shorter than the predetermined wavelength; and an electroabsorption section extending between the two expansion/contraction sections and including a portion of the quantum well structure having, responsive to the on-voltage of the electric signal, a first electroabsorption cutoff wavelength which is shorter than the predetermined wavelength; and, responsive to the off-voltage of the electric signal, a second electroabsorption cutoff wavelength which is longer than the predetermined wavelength;

a semiconductor layer coupled to the wavegulde layer;

a first electrode coupled to the substrate; and a second electrode coupled to the semiconductor layer wherein the electric signal is applied between the first and second electrodes.

6. An optical signal modulation system comprising;

a laser which produces a light beam with a predetermined wavelength and a first beam mode;

a monolithic expanded beam mode electroabsorption modulator including;

an input surface optically coupled to the laser and substantially optimized far low input loss of light beams with the first beam mode;

an expansion section to expand a beam mode of the light beam for increased confinement of the light beam;

an electroabsorption modulation section including a quantum well structure for modulating light of the predetermined wavelength;

a contraction section to contract the beam mode of the light beam to a mode which approximates the first beam mode; and an output surface; and an optical fiber optically coupled to the output surface of the monolithic expanded beam mode electroabsorption modulator and substantially optimized for low input loss and for transmission of light beams with the first beam mode.

7. An extended range optical communication system comprising;

a laser which produces a light beam with a predetermined wavelength, and a first beam mode;

a first optical fiber for transmission of light beams with the predetermined wavelength and the first beam mode, including an input end optically coupled to the laser and an output end;

a monolithic expanded beam mode optical amplifier including;

an input surface optically coupled to the output eat of first optical fiber and substantially optimized for relatively low input loss of light beams with the first beam mode;

an expansion section to expand a beam mode of the light beam for increased confinement of the light beam;

an optical amplification section including a semiconductor gain medium for amplifying light of the predetermined wavelength;

a contraction section to contract the beam mode of the light beam to approximate the first beam mode; and an output surface; and a second optical fiber optically coupled to the output surface of the monolithic expanded beam mode optical amplifier and substantially optimized for low input loss and transmission of light beams with she first beam mode.

8. An extended range optical communications system according to claim 7 wherein the semiconductor gain medium includes a bulk active material.

9. An extended range optical communications system according to claim 7 wherein the semiconductor gain, medium includes a quantum well structure.

10. A low-loss demultiplexer in a temporally multiplexed optical communication system for demultiplexing an input signal including a plurality of channels, each channel modulated at a channel bit rate and temporally offset from other ones of the plurality of channels by less than a minimum time between bits, comprising;

an input optical signal source;

a monolithic expanded beam mode electroabsorption modulator including;

an input surface optically coupled to the input optical signal source and substantially optimized for low input loss of the input signal;

an expansion section to expand a beam mode of the input signal for increased confinement of the input signal;

an electroabsorption modulation section including a quantum well structure for modulating light of the expanded input signal to select one channel of the input signal by periodic modulation at the channel bit rare and temporal offset of the selected channel;

a contraction section to contract the beam mode of the selected channel of the input; and an output surface; and a receiver optically coupled to the output surface of the monolithic expanded beam mode electroabsorption modulator to receive the selected channel of the input signal.

11. A low-loss demultiplexer for demultiplexing a time division multiplexed optical signal including a plurality of channels, each channel transmitted as blocks of pulses which are temporally interleaved with blocks of pulses of other channels, comprising;

an optical beam splitter for splitting the time division multiplexed optical signal into a plurality of split optical signals;

a monolithic expanded beam mode electroabsorption modulator including;

an input surface optically coupled to one of the split optical signals of the optical beam splitter and substantially optimized for low input loss of the one split optical signal;

an expansion section to expand a beam mode of the one split optical signal for increased confinement of the one split optical signal;

an electroabsorption modulation section including a quantum well structure for modulating light of the expanded one split optical signal to select blocks of a first channel or the one split optical signal;

a contraction section to contract the beam mode of the selected first channel blocks; and an output surface; and a buffer optically coupled to the output surface of the monolithic expanded beam mode electroabsorption modulator to store the selected first channel blocks.

* * * * *